US005501555A

United States Patent [19]

Muetschele et al.

[11] Patent Number: 5,501,555

[45] Date of Patent: Mar. 26, 1996

[54] BLOCKING DEVICE FOR TOOL HOLDER OF HAND POWER TOOL AND HAND POWER TOOL PROVIDED THEREWITH

[75] Inventors: Ulrich Muetschele; Harald Schindler, both of Stuttgart, Germany

[73] Assignee: Robert Bosch GmbH, Stuttgart, Germany

[21] Appl. No.: 388,747

[22] Filed: Feb. 15, 1995

[30] Foreign Application Priority Data

Feb. 26, 1994 [DE] Germany .......................... 44 06 394.6

[51] Int. Cl.$^{6}$ ............................ B23B 45/00; E05B 73/00

[52] U.S. Cl. ............................ 408/241 R; 70/15; 70/61; 70/58; 279/125; 279/158; 408/710; 173/171

[58] Field of Search .................................... 408/4, 241 R, 408/710; 279/125, 158, 157; 70/14, 15, 57, 58, 61, 158, 163, 166–169; 173/171

[56] References Cited

U.S. PATENT DOCUMENTS

| | | | |
|---|---|---|---|
| 2,327,334 | 8/1943 | Parker | 70/57 |
| 3,130,571 | 4/1964 | Neumann | 70/58 |
| 3,785,183 | 1/1974 | Sander | 70/58 |
| 5,344,329 | 9/1994 | Faller | 70/57 |

*Primary Examiner*—Steven C. Bishop
*Attorney, Agent, or Firm*—Michael J. Striker

[57] ABSTRACT

A hand power tool has a tool holder, and a blocking device for the tool holder, the blocking device being connectable with the tool holder and provided with a key unlockable blocking body which secured the blocking device from undesired withdrawal. When the blocking body is connected with the tool holder it blocks the tool holder from insertion of a tool.

22 Claims, 2 Drawing Sheets

BLOCKING DEVICE FOR TOOL HOLDER OF HAND POWER TOOL AND HAND POWER TOOL PROVIDED THEREWITH

BACKGROUND OF THE INVENTION

The present invention relates to a blocking device for a tool holder of a hand power tool and a hand power tool provided with such a blocking device, in particular a hammer drill or an impact hammer.

Hand power tools which are commercially available have the disadvantage that they are not protected from unauthorized start or theft. The operator is forced either to carry the hand power tool with him or to keep in a reliable location. This however is very complicated particularly during short absences from the workplace.

SUMMARY OF THE INVENTION

Accordingly, it is an object of the present invention to provide a blocking device for a tool holder of a hand power tool, which avoids the disadvantages of the prior art.

In keeping with these objects and with others which will become apparent hereinafter, one feature of the present invention resides, briefly stated, in a blocking device for a tool holder of a power tool, in particular a hammer drill or an impact hammer, wherein in accordance with the present invention the blocking device is connectable with the tool holder of the hand power tool and in this position is securable by a key lockable blocking body against undesired removal, whereas the blocking device connected with the hand power tool blocks insertion of the tool into the tool holder of the hand power tool.

When the blocking device is designed in accordance with the present invention, it has the advantage that the hand power tool is efficiently protected from unauthorized start or theft. By blocking of the tool receptacle of a tool holder with the inserted blocking device, the insertion of the tool is prevented so that the hand power tool cannot be used.

In accordance with another advantageous feature of the present invention, the blocking device is provided with a lock which is unlockable by a key.

The blocking device can be made very compact so that it can be for example inserted into the tool receptacle of a hammer drill. The blocking device can be provided with means for optical recognition, and therefore the blocking of the tool holder can be signalled outside.

Finally, a chain or a wire cord can be provided, so that the hand power tool with the blocking device can be connected with any stationary body.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
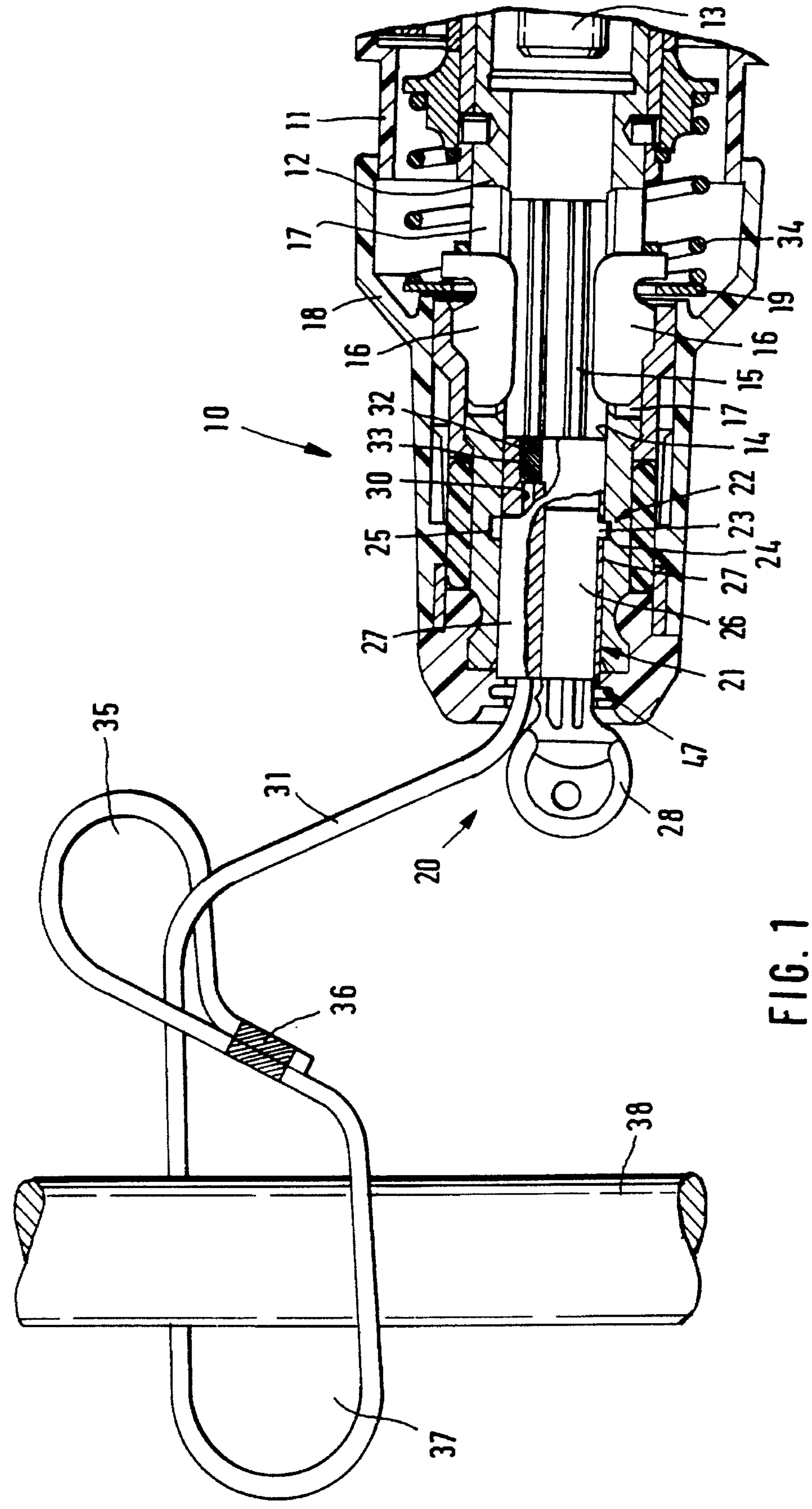
FIG. 1 is a view showing a blocking device for a hand power tool in accordance with a first embodiment of the present invention.

FIG. 1 shows a cross-section of a front part of a conventional hammer drill at the side of the tool. The hammer drill has a tool holder 10 for receiving of tools with cylindrical grooved shafts. The tool holder extends from a housing 11 of a not shown hammer drill and is provided with a hollow cylindrical guiding sleeve 12. A striking body 13 of a not shown striking mechanism is axially reciprocatingly guided inside the guiding sleeve 12 for receiving the tool with the grooved shaft. In the shown hammer drill the guiding sleeve 12 is rotated in the housing 11 via not shown means, for example a ball bearing and is rotatingly driven by a not shown drive motor. When the power tool is an impact hammer, the rotary drive is dispensed with.

Drivers 15 for the tool shaft are provided inside the receiving opening 14 and can be formed as axially extending driver strips. Moreover, two locking bodies 16 which are opposite to one another are arranged in the tool holder 10. With the inserted tool shaft, they engage in a locking groove of the tool shaft so that the tool is axially displaceable in the receiving opening 14 within certain limits. Each of the locking bodies 16 is arranged in a passage 17 provided in the guiding sleeve 12 and loaded by a closing spring 34 through a closing spring 19 with a force directed axially forwardly. Thereby the locking bodies are retained in a locking position. When an unlocking sleeve 18 is actuated against the spring force 34, the locking bodies are displaced axially rearwardly. They slide radially otuwardly along a stepped curve and therefore release the receiving opening 14 and the grooved shaft.

The tool holder 10 is blocked by a blocking device 20. The blocking device has a blocking body 21 which extends axially into the receiving opening 14. The blocking body 21 is provided with a blocking element 22 which is formed as a radially extending projection 23. The projection 23 extends radially into a locking recess 24 formed in the receiving opening 14 and forms a form-locking means against axial displacement of the blocking body 21. The blocking recess 24 is formed as a circumferential annular groove 25. The blocking element 22 is formed on a rotatable lock cylinder 26 which is arranged in a base body 27 of the blocking body 21 eccentrically to the longitudinal axis of the tool holder 10. A window is formed in its wall for passage of the blocking element 22. The base body 27 and the lock 26 together form a cylinder lock 47. After the insertion of a corresponding key 28 in the cylinder lock 27 the lock cylinder 26 is turnable in the base body 27 around its longitudinal axis, and the projection 26 radially disengages from the ring groove 25. The blocking body 21 is therefore released so that the blocking device 20 can be removed from the tool holder 10.

The base body 27 has an axial throughgoing opening 13 in which a wire cable 31 is arranged. The wire cable 31 is provided with a clamping sleeve 32 at its end located in the blocking body 21. The clamping sleeve 32 has a greater outer diameter than the throughgoing opening 30 and is located in a recess 33 in the base body 27 to secure the wire cable 31 against withdrawal from the blocking body 21. The wire cable 31 is provided with a loop 35 at another end. The blocking body 21 can pass through the loop 35, and the loop 35 is fixed by a wire clamp 36. In this manner, the blocking device 20 can be connected with a stationary body, for example a rod 38 by forming a mounting loop 37. The lock cylinder 26, the base body 27 and the wire cable 31 as well as the wire clamp 36 are preferably made of hardened steel. After withdrawal of the key 28 from the cylinder lock in the blocking position of the blocking element 22, the tool holder 10 is blocked from insertion of a tool. The attached hammer drill is also secured against stealing. The wire cable 31 forms an efficient means for optical recognition of the blocking device 20 arranged on the inserted blocking body 21.

Figure 2:
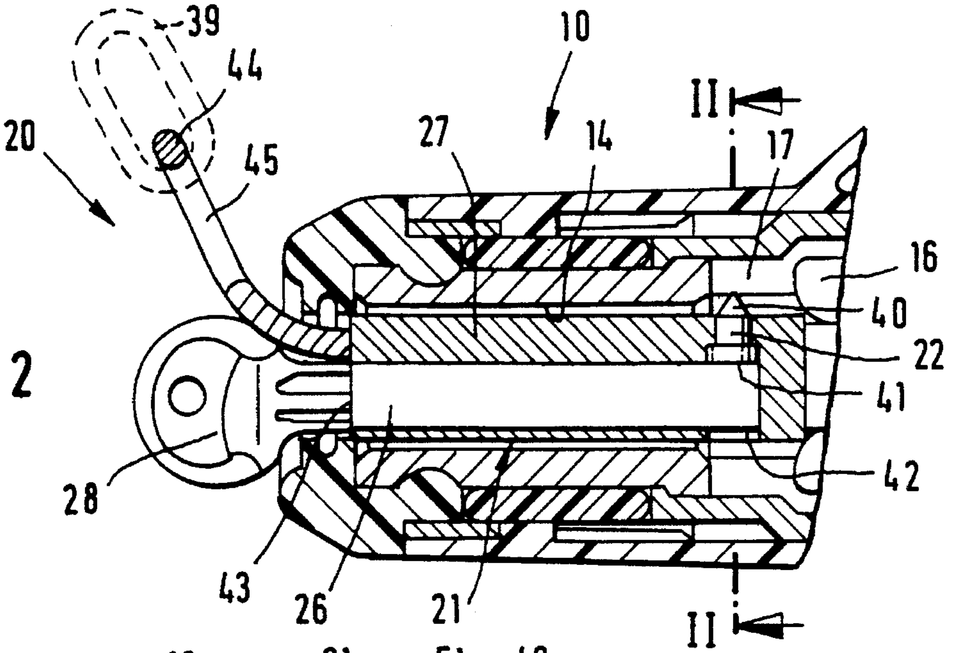
FIG. 2 is a view showing a blocking device for a hand power tool in accordance with a second embodiment of the present invention.

The second embodiment of the inventive blocking device 20 shown in FIG. 2 differs from the first embodiment in that, the blocking recess 24 is formed as a throughgoing passage 17 for the locking body 16. The parts of the second embodiment which correspond to the parts of the first embodiment are identified with the same reference numerals. The blocking body 21 has a long axial extension, and the locking bodies 16 are offset axially rearwardly against the force of the spring 31 during the insertion of the blocking body 21. This is analogous to the known insertion of a tool shaft. The blocking element 22 radially engages into the released passage 17. It is also possible to form the blocking body 21 with a correspondingly smaller outer diameter and to make it correspondingly longer, so that the blocking element 22 engages in the throughgoing passage 17 axially behind the locking body 16, as shown in FIG. 1.

The blocking element 20 in the embodiment of FIG. 2 is formed as a radially displaceable blocking pin. At its radially outwardly extending end 40 it is provided with a conical tip and its radially inwardly located end 41 it is formed as a collar and flattened. The flattened end 41 cooperates with a control cam 42 formed on the lock cylinder 26 non-rotatably relative to the latter.

A steel bracket 44 is provided on an outwardly located end side of the blocking body 21 above the lock cylinder 26. It is bent to form an ear 45 which is completely closed in a peripheral direction. The ear 45 serves for connecting the hammer drill for example with a chain and an additional padlock. A chain can be directly connected with the ear 45, and a chain member 39 of the chain is shown in FIG. 2. The cylinder lock 47 is formed so that after withdrawal of the key 28 its lock cylinder 26 is secured from turning. The blocking element 22 is held in its locking position in engagement with the throughgoing passage 17 so that an axial removal of the blocking device 20 from the tool holder 10 is impossible.

Figure 3:
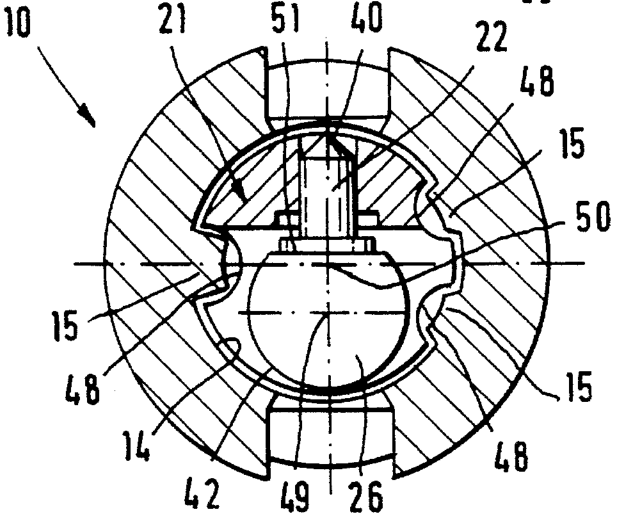
FIGS. 3 and 4 are views correspondingly showing a section taken along the line II—II in FIG. 2.
Figure 4:
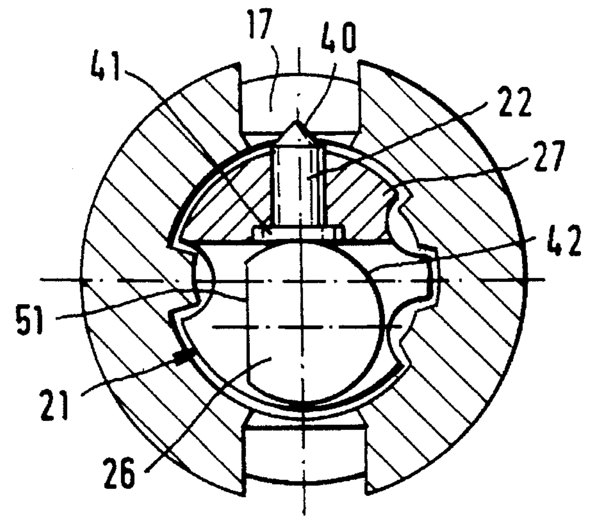

FIGS. 3 and 4 show correspondingly a section through the tool holder 10 of FIG. 2 at the height of the blocking element 22. FIG. 3 illustrates an unlocked position while FIG. 4 illustrates a blocked position. In both sections the receiving opening 14 with the drivers 15 formed in it can be clearly recognized. The blocking body 21 inserted in the receiving opening 14 has recesses 48 on its outer side for receiving the drivers 15. The control cam 42 is formed over three-fourth of the circumference of the lock cylinder 26 and has a flattening 51 at its one end. When the flattening 51 and the blocking element 22 are located radially opposite to one another, the blocking element 22 can move radially inwardly. The blocking device assumes its unlocking position and the blocking body 21 is removed from the tool holder 10. Due to the inclination of its conical tip 40, the blocking element 22 during withdrawal of the blocking body 21 from the tool holder 10 is pressed radially inwardly.

FIG. 4 shows the lock cylinder 26 which is turned by 90 degree relative to its position in FIG. 3. The cylindrical part of the control cam 42 is located then opposite to the blocking element 22, so that the blocking element 22 engages radially outwardly with its conical tip 40 into the throughgoing passage 17. Thereby the blocking body 21 is secured from an axial withdrawal from the tool holder 20.

It is especially advantageous when means for optical recognition of the inserted blocking body 21 are provided on a part of the base body 27 which extends from the receiving opening 14 with the inserted blocking body 21. For example, such means can be provided on a collar. The collar can extend in a mushroom shape from the tool holder 10, and therefore the insertion or withdrawal of the blocking device 20 is facilitated. By color marking of the outwardly extending part, additionally the uselessness of the inventive secured tool holder 10 can be identified. The blocking element 22 can be also unlockable by a combination lock, for example a digital lock.

The inventive device can be used not only with the hammer drill and impact hammer, but also with all hand power tools in which the tool receptacle of a tool holder must be blocked against insertion of a tool.

It will be understood that each of the elements described above, or two or more together, may also find a useful application in other types of constructions differing from the types described above.

While the invention has been illustrated and described as embodied in a blocking device for a tool holder of a hand power tool and a hand power tool provided with such a blocking device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A combination of a tool holder and a blocking device for a hand power tool, comprising a tool holder; and a blocking device for said tool holder, said blocking device being connectable with said tool holder and provided with a key unlockable blocking body which secures said blocking device from undesired withdrawal, so that when said blocking body is connected with said tool holder it blocks said tool holder from insertion of a tool.

2. A combination as defined in claim 1, wherein said blocking body has a lock which is unlockable by a key.

3. A combination as defined in claim 1, wherein said tool holder has a receiving opening, said blocking body being axially insertable in said receiving opening of said tool holder; and further comprising a blocking element which blocks said blocking body in said receiving opening of said tool holder.

4. A combination as defined in claim 3, wherein said blocking body is substantially cylindrical and has a diameter substantially corresponding to an inner diameter of said receiving opening, said blocking body being provided with longitudinal recesses, while said tool holder is provided with corresponding drivers.

5. A combination as defined in claim 3, wherein said receiving opening has a blocking recess, said blocking element in its blocking position form-lockingly engaging in said blocking recess when said blocking body is inserted in said receiving opening.

6. A combination as defined in claim 5; and further comprising a locking body for a tool locking, said blocking recess being formed as a throughgoing passage which is provided in said tool holder for said locking body.

7. A combination as defined in claim 5, wherein said blocking recess is formed as a ring groove provided in an inner wall of said receiving opening.

8. A combination as defined in claim 1, wherein said blocking body is provided with means for optical recognition of said locking device inserted in said tool holder.

9. A combination as defined in claim 1, wherein said blocking body is provided with means for stationary attachment of said blocking body.

10. A combination as defined in claim 1, wherein said means for stationary attachment of said blocking body is formed as a wire cable.

11. A combination as defined in claim 1, wherein said means for stationary attachment of said blocking body is formed as a chain.

12. A hand power tool, comprising a tool holder; and a blocking device for said tool holder, said blocking device being connectable with said tool holder and provided with a key unlockable blocking body which secured said blocking device from undesired withdrawal, so that when said blocking body is connected with said tool holder it blocks said tool holder from insertion of a tool.

13. A hand power tool as defined in claim 12, wherein said blocking body has a lock which is unlockable by a key.

14. A hand power tool as defined in claim 12, wherein said tool holder has a receiving opening, said blocking body being axially insertable in said receiving opening of said tool holder; and further comprising a blocking element which blocks said blocking body in said receiving opening of said tool holder.

15. A hand power tool as defined in claim 14, wherein said blocking body is substantially cylindrical and has a diameter substantially corresponding to an inner diameter of said receiving opening, said blocking body being provided with longitudinal recesses, while said tool holder is provided with corresponding drivers.

16. A hand power tool as defined in claim 14, wherein said receiving opening has a blocking recess, said blocking element in its blocking position form-lockingly engaging in said blocking recess when said blocking body is inserted in said receiving opening.

17. A hand power tool as defined in claim 16; and further comprising a locking body for a tool locking, said blocking recess being formed as a throughgoing passage which is provided in said tool holder for said locking body.

18. A hand power tool as defined in claim 16, wherein said blocking recess is formed as a ring groove provided in an inner wall of said receiving opening.

19. A hand power tool as defined in claim 12, wherein said blocking body is provided with means for optical recognition of said locking device inserted in said tool holder.

20. A hand power tool as defined in claim 12, wherein said blocking body is provided with means for stationary attachment of said blocking body.

21. A hand power tool as defined in claim 12, wherein said means for stationary attachment of said blocking body is formed as a wire cable.

22. A hand power tool as defined in claim 12, wherein said means for stationary attachment of said blocking body is formed as a chain.

* * * * *